(12) United States Patent
Juranitch et al.

(10) Patent No.: US 7,162,903 B2
(45) Date of Patent: Jan. 16, 2007

(54) SHAFT TRUING SYSTEM

(75) Inventors: James C. Juranitch, Walled Lake, MI (US); Robert D. Olschefski, New Hudson, MI (US)

(73) Assignee: Veri-Tek International Corporation, Wixom, MI (US)

( * ) Notice: Subject to any disclaimer, the term of this patent is extended or adjusted under 35 U.S.C. 154(b) by 73 days.

(21) Appl. No.: 10/487,289

(22) PCT Filed: Aug. 20, 2002

(86) PCT No.: PCT/US02/26567

§ 371 (c)(1),
(2), (4) Date: Feb. 20, 2004

(87) PCT Pub. No.: WO03/081060

PCT Pub. Date: Oct. 2, 2003

(65) Prior Publication Data

US 2004/0231381 A1 Nov. 25, 2004

Related U.S. Application Data

(60) Provisional application No. 60/313,739, filed on Aug. 20, 2001, provisional application No. 60/313,734, filed on Aug. 20, 2001, provisional application No. 60/313,741, filed on Aug. 20, 2001.

(51) Int. Cl.
*B21D 15/00* (2006.01)

(52) U.S. Cl. .......................... 72/110; 72/31.03; 72/80; 72/389.1

(58) Field of Classification Search .............. 72/31.02, 72/31.03, 31.07, 80, 100, 102, 107, 109, 72/110, 111, 389.1
See application file for complete search history.

(56) References Cited

U.S. PATENT DOCUMENTS 3,213,659 A * 10/1965 Armstrong .................. 72/69
3,253,444 A * 5/1966 Dolan et al. ................. 72/107

(Continued)

FOREIGN PATENT DOCUMENTS

DE 29 05 386 10/1980

(Continued)

*Primary Examiner*—Ed Tolan
(74) *Attorney, Agent, or Firm*—Rohm & Monsanto, P.L.C.

(57) ABSTRACT

An apparatus for processing a drive shaft (11) for a vehicle, the drive shaft (11) having a longitudinal axis and first and second ends. There is provided a drive arrangement for coupling to the first end of the drive shaft and applying a rotatory force to the drive shaft (11). A second end support arrangement rotationally supports the drive shaft (11) at its second end. Also, a transaxial drive (35) for applying a transverse force in a direction transverse to the longitudinal axis of the drive shaft (11). The transaxial drive includes a transaxially displaceable roller arrangement for communicating with an outer surface of the drive shaft (11) in a region thereof intermediate of the drive arrangement and the support arrangement, via which the transverse force is applied. The transverse force has a magnitude sufficient to cause bending of the drive shaft (11) in the direction transverse to the longitudinal axis thereof as the drive shaft is rotated. In some embodiments, the transverse force has a magnitude sufficient to cause plastic deformation of the drive shaft (11) in the direction transverse to the longitudinal axis thereof as the drive shaft is rotated.

21 Claims, 7 Drawing Sheets

U.S. PATENT DOCUMENTS

| | | | |
|---|---|---|---|
| 3,316,743 A | 5/1967 | Ovshinsky | 72/10 |
| 3,583,191 A * | 6/1971 | Colonius et al. | 72/110 |
| 3,823,588 A * | 7/1974 | Ancarrow et al. | 72/7.4 |
| 4,076,136 A * | 2/1978 | Jenkin | 414/433 |
| 4,624,123 A * | 11/1986 | Marracino | 72/110 |
| 4,700,439 A | 10/1987 | Hines | 29/33 |
| 4,788,844 A * | 12/1988 | Summers et al. | 72/110 |
| 5,428,979 A | 7/1995 | Knipp et al. | 72/34 |

FOREIGN PATENT DOCUMENTS

| | | |
|---|---|---|
| GB | 1074747 | 7/1967 |

* cited by examiner

SHAFT TRUING SYSTEM

RELATIONSHIP TO OTHER APPLICATIONS

This application is a 35 USC 371 of PCT/US02/26567, filed Aug. 20, 2002.

This application claims the benefit of the filing date of U.S. Provisional Patent Application Ser. Nos. 60/313,741; 60/313,734; and 60/313,739; all of which were filed on Aug. 20, 2001 in the names of the same inventors as herein.

BACKGROUND OF THE INVENTION

1. Field of the Invention

This invention relates generally to methods and apparatus for straightening shafts, and more particularly, to a system for truing large shafts, such as vehicle drive shafts.

2. Description of the Related Art

Vehicle drive shafts are large and tubular, and difficult to manufacture in a manner that they are rendered consistently true. Such shafts, among other shaft products, are very sensitive to bends in their main shaft portions. These imperfections cause noise, vibration, and harshness ("NVH") issues, and also make final correction balance of the product difficult. One approach to achieving a correction to a vehicle drive shaft is to rotate the vehicle drive shaft while a human operator observes displacements resulting from irregularities. The human operator will apply a force upon the vehicle drive shaft in a direction that tends to compensate for the observed displacements. This not only is a slow process that is difficult to implement in a modern manufacturing environment, it requires significant skill on the part of the human operator. Clearly, the results will vary with the level of skill of the human operator.

The need for increased accuracy in the truing of vehicle drive shafts results in part from the significantly reduced noise emissions from other modern vehicle components, particularly including the drive train. Modern vehicles are sufficiently quiet that drive shaft noise is becoming an increasing portion of overall vehicle operating noise.

To date many tubular products have been manufactured with an excessive amount of run out or bending imperfections. Manufacturers usually attempt to straighten the tubular product using primitive methods such as a static press force applied between two "V" blocks directly on the shaft. The operator approximates how much force or tube deflection is required for straightening the assembly. This is done by rotating the tube between two "V" blocks and monitoring the run out of the assembly on a dial indicator gauge. After establishing the maximum run out the operator will position the tube on its high point, and force the tube into plastic deformation using a ram. The operator will then measure again the amount of bend in the product and repeat the process as many times as needed to reduce the shaft bending into an acceptable tolerance. Bending in this case is defined as the deflection measured between the three points identified by the "V" blocks, and the dial indicator. It should be noted that these points are not the same areas to which the vehicle would react to in actual operation. Many experts in the field of drive shaft manufacturing feel the current straightening operations actually do more harm than good.

It is, therefore, an object of this invention to provide a system whereby a vehicle drive shaft can quickly and simply be trued.

It is another object of this invention to provide a system whereby a vehicle drive shaft can accurately be trued without relying on the skill of a human operator.

The present invention significantly reduces the imperfections in a tubular or cylindrical assembly related to bending. It is therefor well suited to drive shaft manufacturing. Most importantly the invention is also designed to straighten the tubular assembly relative to a rotating datum. The rotating datum is referred to as the True Vehicle Running Center (TVRC) of the product. This process of truing is accomplished at high rates of speed, which suits the operation well to mass production.

SUMMARY OF THE INVENTION

The foregoing and other objects are achieved by this invention which provides an apparatus for processing a drive shaft for a vehicle, the drive shaft having a longitudinal axis and first and second ends. In accordance with the invention, there is provided a drive arrangement for coupling to the first end of the drive shaft and applying a rotatory force to the drive shaft. A second end support arrangement rotationally supports the drive shaft at its second end. Also, a transaxial drive for applying a transverse force in a direction transverse to the longitudinal axis of the drive shaft.

In one embodiment, the transaxial drive includes a transaxially displaceable roller arrangement for communicating with an outer surface of the drive shaft in a region thereof intermediate of the drive arrangement and the support arrangement, via which the transverse force is applied. The transverse force has a magnitude sufficient to cause bending of the drive shaft in the direction transverse to the longitudinal axis thereof as the drive shaft is rotated. In some embodiments, the transverse force has a magnitude sufficient to cause plastic deformation of the drive shaft in the direction transverse to the longitudinal axis thereof as the drive shaft is rotated.

In a further embodiment, the second end support arrangement includes first and second rollers arranged to support rotatively the drive shaft in a direction counter to that of the transverse force. Also, the first and second rollers of the second end support arrangement are each provided with radially extended central portions.

There is further provided a first end support arrangement for rotationally supporting the drive shaft at its first end. The first end support arrangement includes first and second rollers arranged to support rotatively the drive shaft in a direction counter to that of the transverse force. The first and second rollers of the first end support arrangement are each provided with radially extended central portions. Additionally, the first end support arrangement includes third and fourth rollers arranged to support rotatively the drive shaft in a direction opposite to that of the first and second rollers of the first end support arrangement. Third and fourth rollers of the first end support arrangement are each provided with radially extended central portions.

In a further embodiment, the transaxial drive includes an hydraulic ram for applying an axial ram force and a linkage arrangement for delivering the axial ram force to the transaxially displaceable roller arrangement. The drive arrangement causes the drive shaft to be rotated at a rate of rotation of approximately between 300 and 6000 rpm.

In some embodiments, the drive shaft has angularly displaceably coupled thereto a second drive shaft portion, and there is further provided a second drive shaft portion support arrangement for supporting the second drive shaft portion rotatably in fixed axial relation to the drive shaft as the drive shaft is rotated. The fixed axial relation may, in some embodiments, be a substantially coaxial relationship.

There is further provided a universal coupler for coupling the second drive shaft portion to the drive shaft, which may be a Thomson shaft.

The second drive shaft portion support arrangement is configured to permit axial displacement of the second drive shaft portion in response to non-trueness of the drive shaft and the application of the transverse force in the direction transverse to the longitudinal axis of the drive shaft.

In accordance with a method aspect of the invention, there is provided a method of improving the trueness of a drive shaft of a vehicle, the drive shaft having a longitudinal axis and first and second ends, the method having the steps of:

installing the drive shaft onto a support arrangement that supports the drive shaft rotatively at its first and second ends;

rotating the drive shaft about its longitudinal axis;

applying a transaxial force to the drive shaft in a region intermediate of the first and second ends; and releasing the transaxial force.

In one embodiment, there is provided the further step of applying includes the step of applying the transaxial force having a magnitude sufficient to bend the drive shaft as it is rotated. The step of rotating the drive shaft about its longitudinal axis includes the step of rotating the drive shaft at a rate of rotation of approximately between 300 and 6000 rpm. There is also provided the further step of supporting in a second support arrangement a second drive shaft portion that is angularly displaceably coupled to the drive shaft.

In other embodiments, there are provided the steps of:

permitting the second drive shaft portion to be displaced longitudinally in the second support arrangement in response to non-trueness of the drive shaft; and permitting the second drive shaft portion to be displaced longitudinally in the second support arrangement in response to the step of applying a transaxial force to the drive shaft.

In other embodiments, the step of applying a transaxial force to the drive shaft includes the steps of:

actuating an hydraulic cylinder to produce an axial displacement of a displacement element;

coupling the displacement element to a roller arrangement; and engaging the roller arrangement to an outer surface of the drive shaft in a region of the drive shaft intermediate of the first and second ends thereof.

In accordance with a product aspect of the invention, there is provided a vehicle drive shaft product formed by the process of:

a. installing a hollow drive shaft tube onto a support arrangement that supports the hollow drive shaft tube rotatively at its first and second ends;

b. rotating the hollow drive shaft tube about its longitudinal axis;

c. applying a transaxial force to the hollow drive shaft tube in a region intermediate of the first and second ends, the transaxial force having a magnitude sufficient to bend the hollow drive shaft tube;

d. releasing the transaxial force; and e. removing the hollow drive shaft tube from the support arrangement;

wherein the thus processed hollow drive shaft tube is the vehicle drive shaft product having a trueness characteristic within a range of approximately between ±0.004 inches.

The thus processed hollow drive shaft tube is the vehicle drive shaft product has a trueness characteristic within a range of approximately between ±0.002 inches.

There is further provided the step of repeating steps a. through e. with a second hollow drive shaft tube to produce a second vehicle drive shaft product also having a trueness characteristic within a range of approximately between ±0.004 inches.

Preferably, The thus processed second hollow drive shaft tube is a second vehicle drive shaft product having a trueness characteristic within a range of approximately between ±0.002 inches.

There is provided the further step of supporting in a second support arrangement a second drive shaft portion that is angularly displaceably coupled to the hollow drive shaft tube. The vehicle drive shaft product is the thus processed hollow drive shaft tube with the second drive shaft portion that is angularly displaceably coupled thereto.

In a further embodiment, there is provided the further step of permitting the second drive shaft portion to be displaced longitudinally in the second support arrangement in response to non-trueness of the drive shaft. Additionally, there is provided the further step of permitting the second drive shaft portion to be displaced longitudinally in the second support arrangement in response to the step of applying a transaxial force to the hollow drive shaft tube.

BRIEF DESCRIPTION OF THE DRAWING

Comprehension of the invention is facilitated by reading the following detailed description, in conjunction with the annexed drawing, in which.

DETAILED DESCRIPTION

Figure 1:
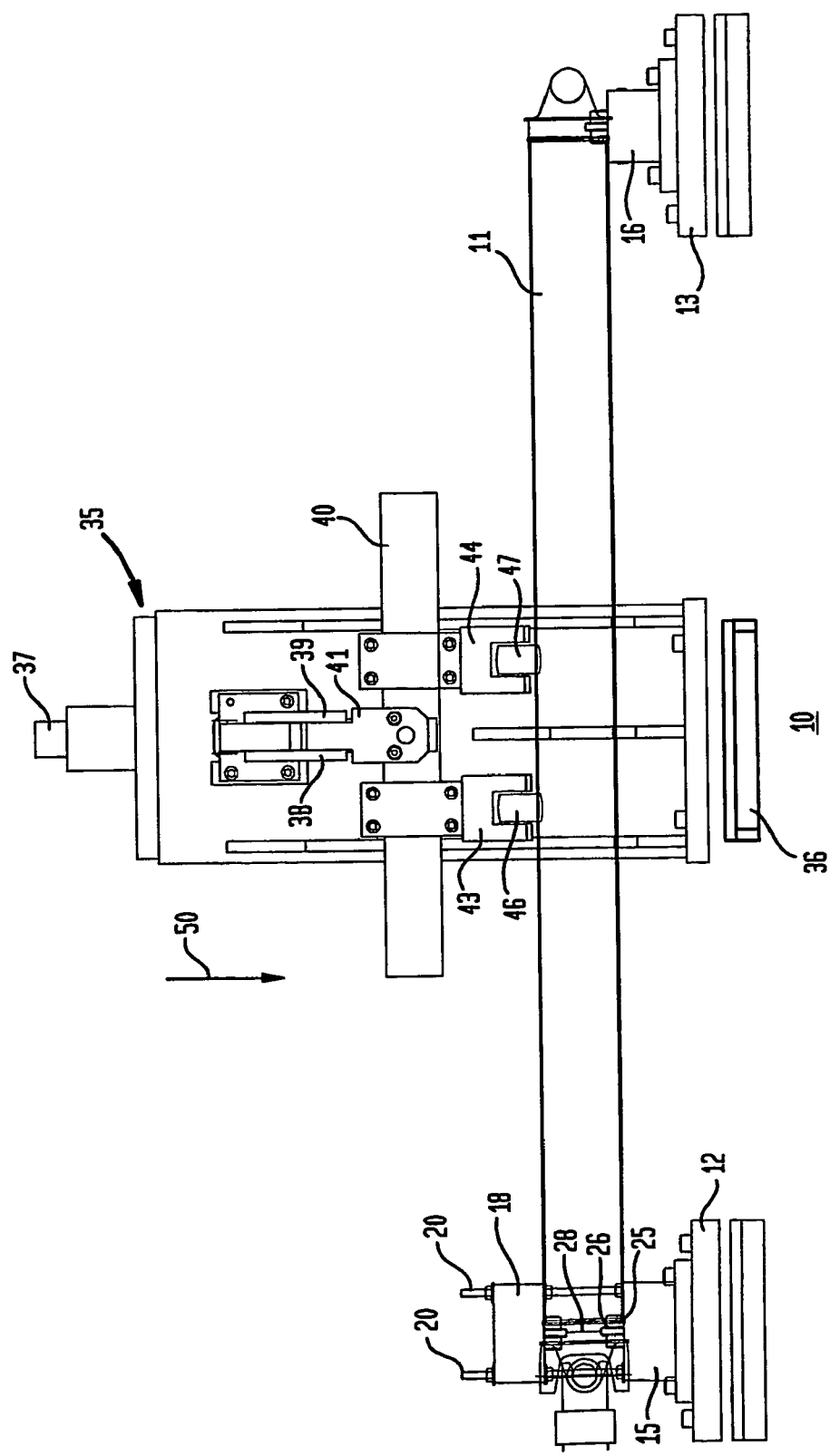
FIG. 1 is a simplified schematic representation of a front plan view of an arrangement for truing a shaft constructed in accordance with the principles of the invention.

FIG. 1 is a simplified schematic representation of a front plan view of a truing arrangement 10 for truing a drive shaft 11 of the type that is used in the propulsion system of a motor vehicle, constructed in accordance with the principles of the invention. In this embodiment, drive shaft 11 is supported at respective ends thereof by respective roller pairs (not completely shown in this figure) that are installed rotatably in respective ones of support beds 15 and 16 that are supported on respective ones of bases 12 and 13. Support bed 15, in this specific illustrative embodiment of the invention, has associated therewith a further pair of support rollers (not completely shown in this figure) that are installed rotatably in a securing support bed 18. In this specific illustrative embodiment of the invention, support bed 15 and securing support bed 18 are coupled to one another by a plurality of threaded posts 20.

Figure 2:
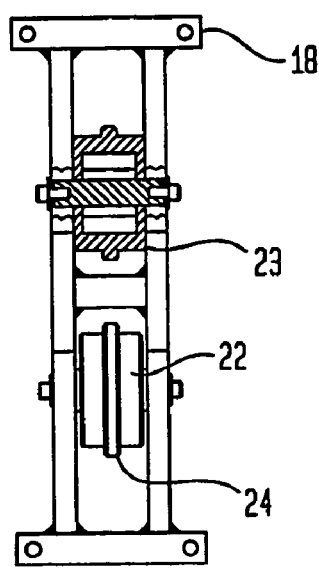
FIG. 2 is a simplified, partially cross sectional schematic representation of a top plan view of a roller support arrangement shown at the left-hand portion of the arrangement of FIG. 1.

FIG. 2 is a simplified, partially cross sectional schematic representation of a top plan view of securing support bed 18 that is shown in the left-hand portion of FIG. 1. FIG. 2 shows securing support bed 18 to have therein two rollers 22 and 23, roller 23 being shown cross-sectionally. In one embodiment, all of the rollers in support beds 15 and 16 are identical to rollers 22 and 23. Roller 22 is representative in this specific illustrative embodiment of the invention of all others of the stated rollers and is shown to have a radially extended central portion 24, which is the portion that communicates with drive shaft 11.

Referring once again to FIG. 1, there is shown extending upward from support bed 15 a portion of a roller 25 extending upwardly therefrom. Roller 25 is shown to have a radially extended central portion 26 that is shown to communicate with drive shaft 11 on a datum line 28 (shown in dashed format).

Figure 3:
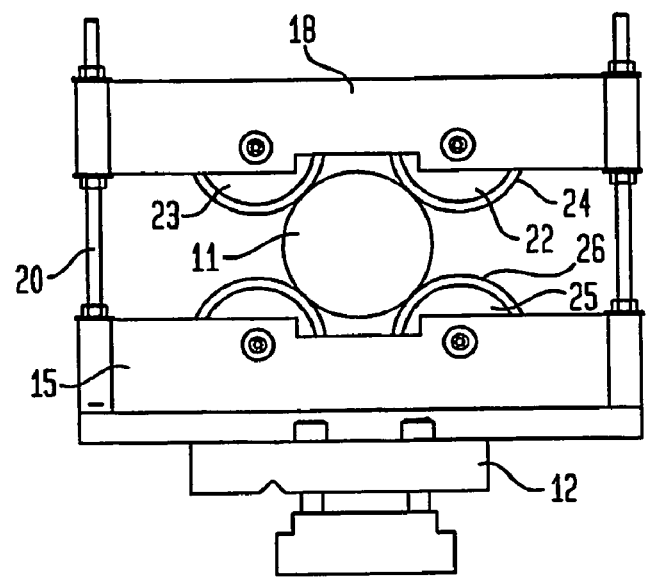
FIG. 3 is an end view from the left-hand side of the arrangement of FIG. 1.

FIG. 3 is an end view from the left-hand side of the arrangement of FIG. 1. Elements of structure that previously have been discussed are similarly designated. As shown in this figure, drive shaft 11 is supported and restrained by communication with the four rollers, as previously described. Each such roller is also shown to have a radially extended central portion, not all of which are specifically designated.

Figure 4:
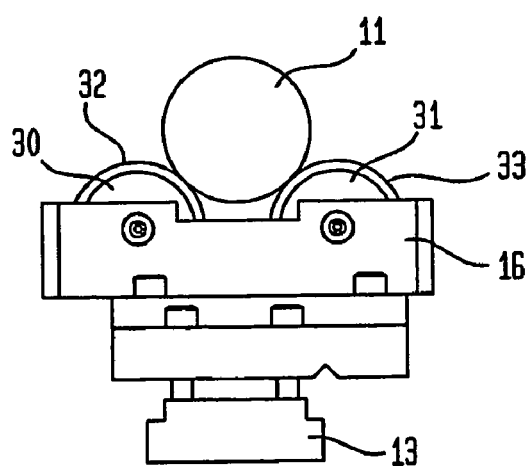
FIG. 4 is an end view from the right-hand side of the arrangement of FIG. 1.

FIG. 4 is an end view from the right-hand side of the arrangement of FIG. 1. Elements of structure that previously have been discussed are similarly designated. As shown in this figure, drive shaft 11 is supported by rollers 30 and 31. Each such roller is also shown in this figure to have an associated one of radially extended central portions 32 and 33, as previously described.

Referring once again to FIG. 1, there is additionally shown a ram arrangement 35 installed on a base 36. Ram arrangement 35 is, in this specific illustrative embodiment of the invention, hydraulically actuated (hydraulic system not entirely shown) and is operated in response to actuation of an hydraulic cylinder 37 that is linked by links 38 and 39 to a press bar 40 via a restrained coupler 41. Press bar 40 (also shown in FIG. 6) has coupled thereto a pair of roller supports 43 and 44, each of which carries a pair of rollers (not entirely shown in this figure) that will be discussed in greater detail in connection with FIG. 6, below. Only rollers 46 and 47 are shown in this figure. Unlike the previously described support and restraining rollers, rollers 46 and 47, as well as the other rollers of these roller pairs, see, for example, roller 52 in FIG. 6, do not have a radially extended central portion. The surfaces of these rollers that communicate with drive shaft 11, in this specific illustrative embodiment of the invention, are slightly curved, as shown.

In operation, drive shaft 11 is rotated, as will be discussed below in connection with the embodiment of FIG. 10. During such rotation, hydraulic cylinder 37 is actuated such that press bar 40, and consequently the aforementioned roller pairs, of which rollers 46 and 52 (FIG. 6) constitute one such pair, are urged downwardly in the direction of arrow 50. In response to the applied lateral force, drive shaft 11 is deflected during the rotation. In this embodiment of the invention, the drive shaft is deflected beyond the limit of restoration that would be effective but for the rotation. Therefore, upon release of the lateral force applied by ram arrangement 35, drive shaft 11 is restored to a straighter condition than before it being subjected to such a truing operation.

Figure 5:
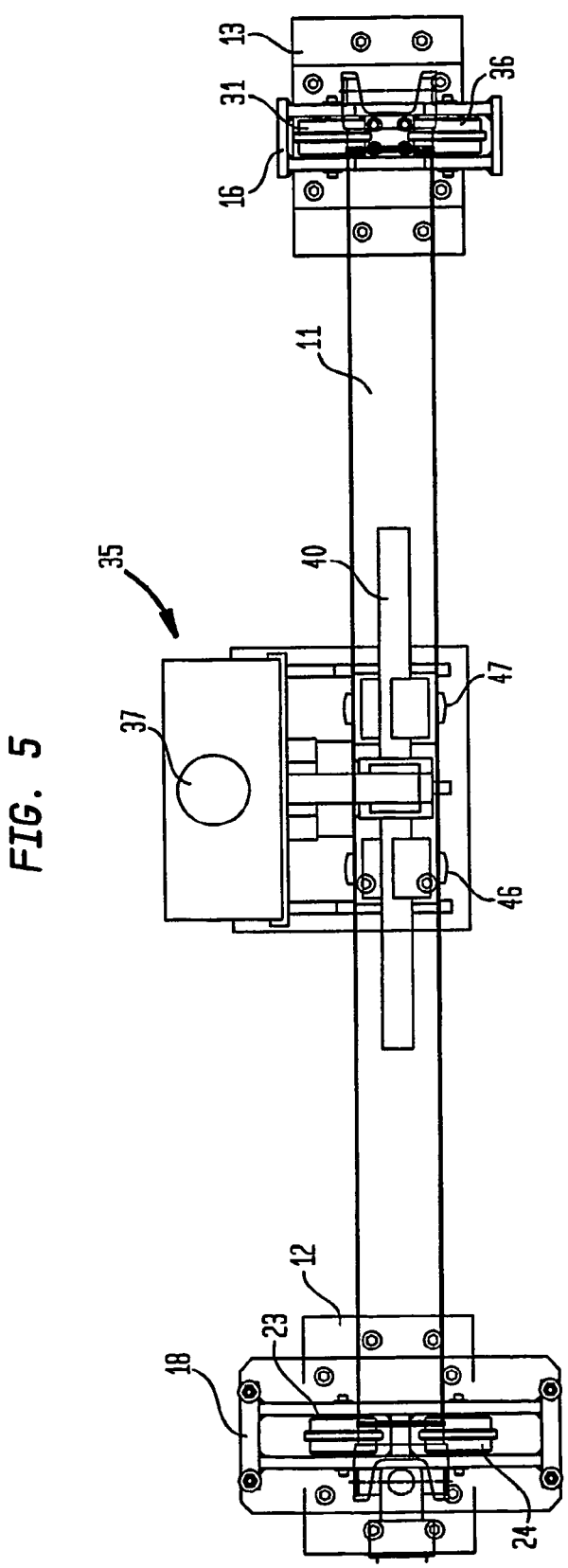
FIG. 5 is a top plan view of the arrangement of FIG. 1.

FIG. 5 is a top plan view of truing arrangement 10, shown in FIG. 1. Elements of structure that previously have been discussed are similarly designated. Drive shaft 11 is shown to be supported, on its right hand side, by rollers 30 and 31.

Figure 6:
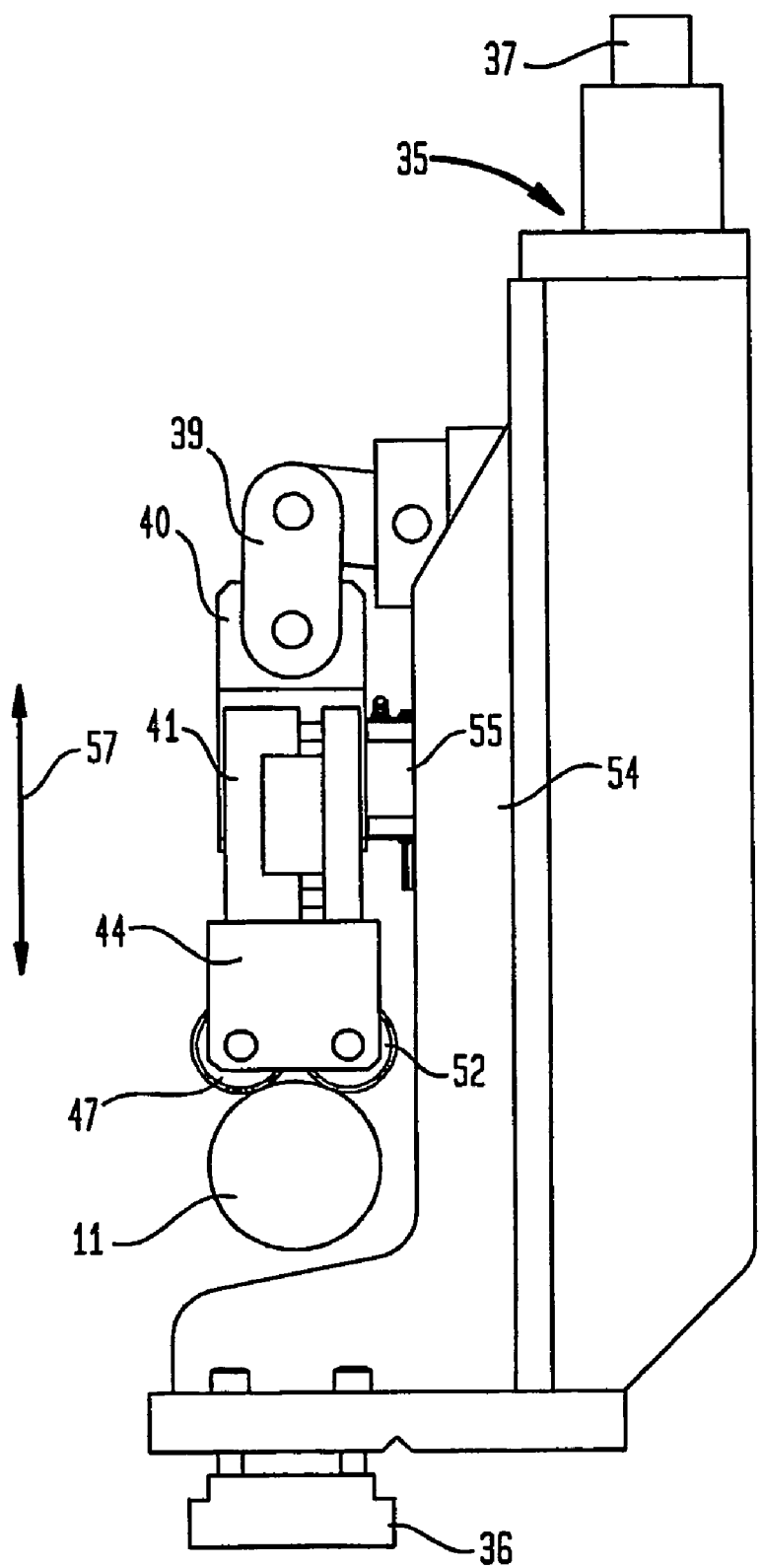
FIG. 6 is a simplified schematic representation of a side plan view of the ram portion of the arrangement of FIG. 1.

FIG. 6 is a simplified schematic representation of a side plan view of the ram portion of the arrangement of FIG. 1. It is to be understood, however, that any known suitable drive arrangement may be used in the practice of the invention. Elements of structure that previously have been discussed are similarly designated. This figure shows that roller support 44 supports a pair of rollers 47 (previously mentioned) and 52. In this specific illustrative embodiment of the invention, both such rollers are configured with a slightly curved surface that communicates with drive shaft 11. It is additionally seen that restrained coupler 41 is engaged with a track 54 via a further coupler 55 that is shown to be engaged on one side thereof to restrained coupler 41 and on its other side to track 54. Such coupling ensures that rollers 47 and 52, as well as roller 46 and its paired roller (neither of which is shown in this figure) travel exclusively in the directions of arrow 57.

Figure 7:
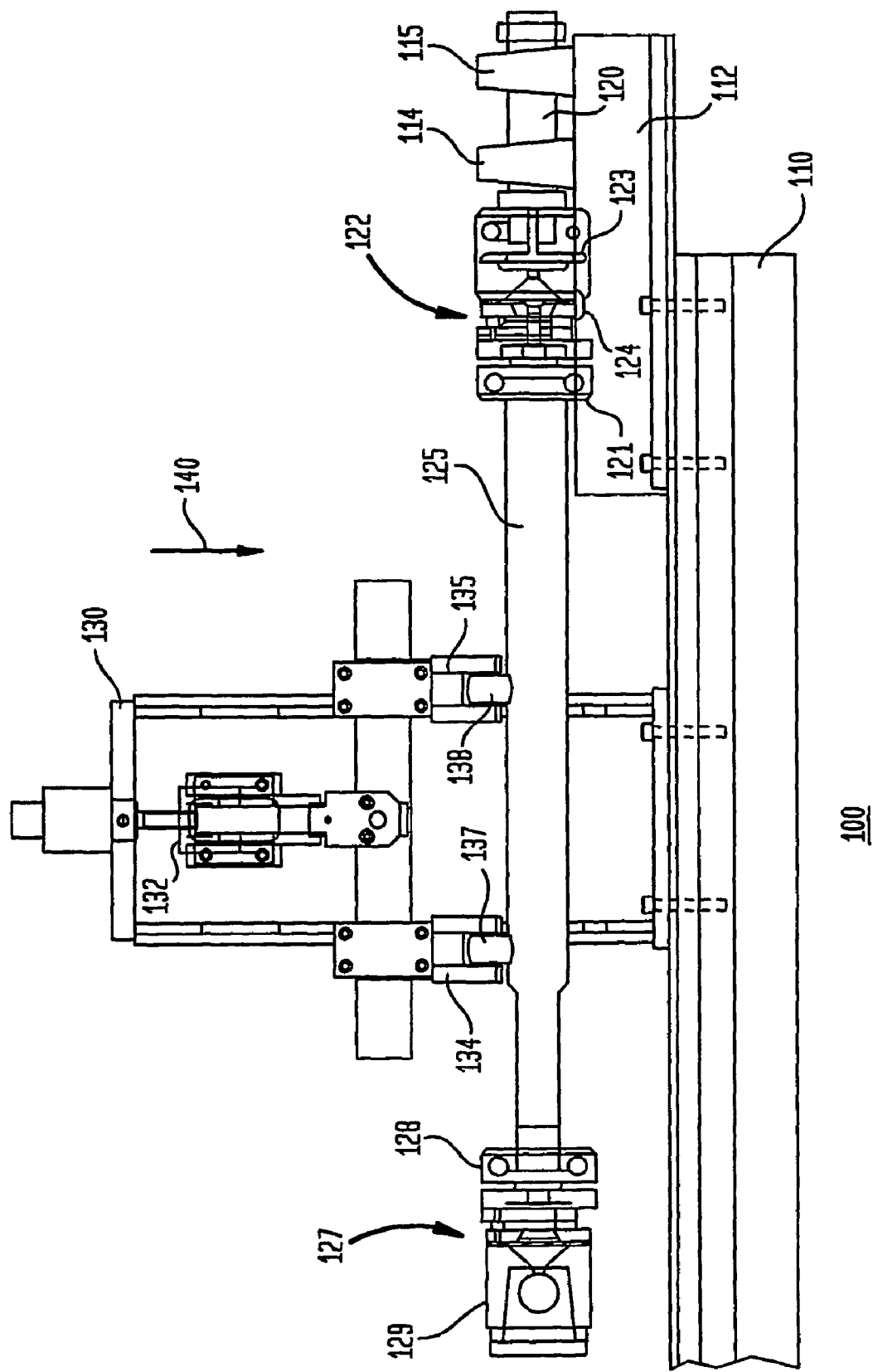
FIG. 7 is a simplified schematic representation of a front plan view of a further arrangement for truing a shaft constructed in accordance with the invention having a displaceable workpiece support arrangement for facilitating installation, holding, and removal of a workpiece.

FIG. 7 is a simplified schematic representation of a front plan view of a truing arrangement 100 for truing a shaft constructed in accordance with the invention. In this simplified arrangement, a base 110 has installed thereon a shaft support 112 that, in this specific illustrative embodiment of the invention is provided with a pair of pillow blocks 114 and 115. A shaft 120, which may in certain embodiments be a Thompson shaft, is rotatably engaged with each of the pillow blocks, and is coupled, by means of a coupler that is designated generally in this figure as 122, to a vehicle drive shaft 125. The vehicle drive shaft is provided at its distal end with a further coupler that is designated generally in this figure as 127. The further coupler is coupled at its distal end to further rotatable structure (not shown in this figure), which in some embodiments of the present invention may be similar to shaft support 112, pillow blocks 114 and 15, and shaft 120.

Couplers 122 and 127 are configured to maintain a rotatory coupling irrespective of transaxial displacement of vehicle drive shaft 125 resulting from it being either in a non-true condition or deflected in response to the application of a lateral force in the central region thereof, as will be described below. In this specific illustrative embodiment of the invention, coupler 122 has a part clamp 121 coupled to bar clamp 123 via a tool steel ball 124. Coupler 127 also is formed of two portions, a part clamp 128 and a lathe adapter 129, which locate and clamp on the shaft's datum centerline (not specifically identified in this figure).

Once supported in a horizontal orientation, vehicle drive shaft 125 is rotated at approximately between 300 and 1500 rpm in this specific illustrative embodiment of the invention by the application of a rotatory force by operation of structure that is not shown in this figure. Persons of skill in the art readily can configure structure for imparting rotation to vehicle drive shaft 125, and effect rates of rotation without being limited to range of rate of rotation set forth herein.

Figure 8:
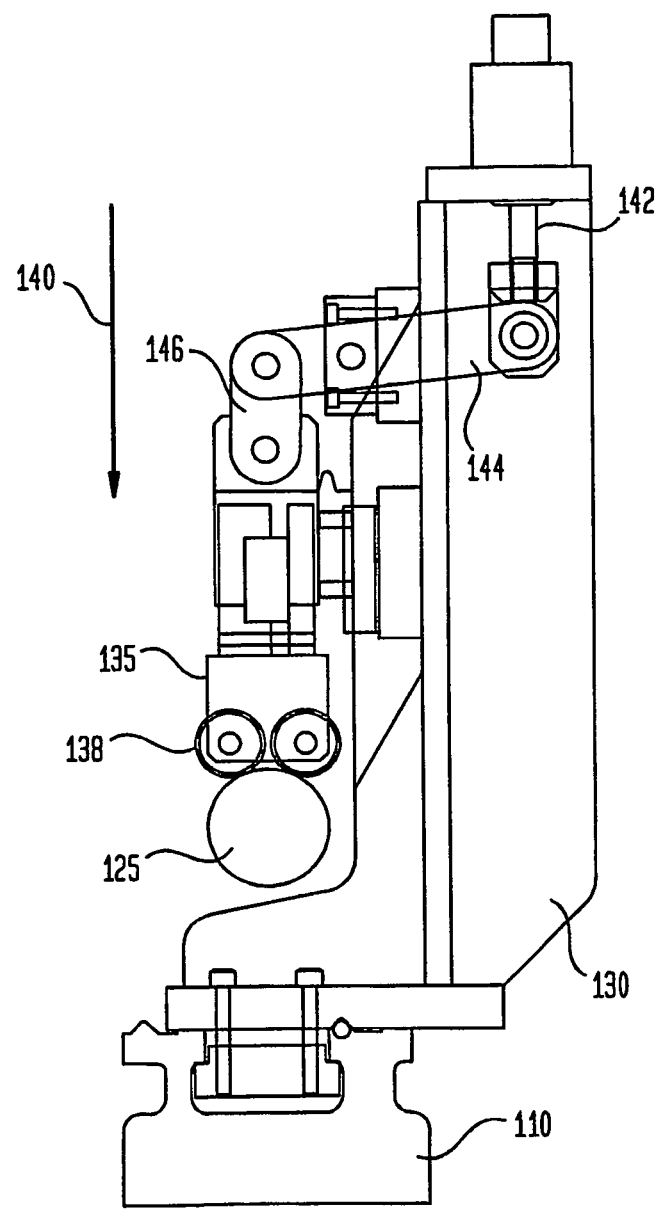
FIG. 8 is a simplified partially cross-sectional schematic representation of a side plan view of a portion of the arrangement of FIG. 7 for truing a shaft.

There is additionally installed on base 110 a frame 130, which is in several respects similar, in this embodiment, to ram 35 described hereinabove in connection with FIGS. 1 and 6. In the specific illustrative embodiment of FIG. 7, an hydraulic press 132, that will be described in greater detail in connection with FIG. 8, is attached at its upper end to frame 130, and has installed on its lower end a pair of roller mounts 134 and 135. Each such roller mount has installed thereon a respectively associated one of roller pairs 137 and 138. In this figure, only one roller of each roller pair is shown. In a practical embodiment of the invention, the rollers can be adjusted for width and offset to accommodate shafts that have complex shapes, possibly due to crush zones.

FIG. 8 is a simplified partially cross-sectional schematic representation of a side plan view of a portion of truing arrangement 100 showing roller pair 138 in communication with vehicle drive shaft 125. Elements of structure that previously have been mentioned are similarly designated. In this specific illustrative embodiment of the invention, the roller pairs apply a downward force on vehicle drive shaft 125 (in the direction of arrow 140), by operation of an actuator 142 that is hydraulically operated in this embodiment. Actuator 142 is coupled to one end of pivoted arm 144, which is coupled at its distal portion to a link 146. Thus, as actuator 142 is urged upwardly, link 146 and roller mount 135 coupled thereto are urged downwardly, thereby exerting a lateral force on rotating vehicle drive shaft 125.

In operation, the downward force applied to vehicle drive shaft 125 is of a magnitude that, but for the rotation of the vehicle drive shaft, would cause a permanent deflection therein. That is, the force is sufficient to bend the vehicle drive shaft into plastic deformation, beyond its static elastic limit. During such deflection, the ends of vehicle drive shaft 125 are maintained in axial alignment by operation of couplers 122 and 127 that retain a fixed axial alignment. Upon effecting a slow release of the lateral load while the shaft is rotating, the vehicle drive shaft is corrected to a true center rotation. This process produces a near perfectly straight shaft relative to the true vehicle rotating center ("TVRC").

Figure 9:
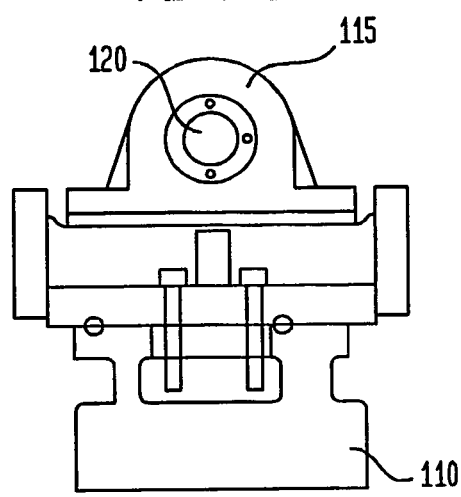
FIG. 9 is a simplified partially cross-sectional schematic representation of a side plan view of a further portion of the arrangement of FIG. 7 for truing a shaft.

FIG. 9 is a simplified partially cross-sectional schematic representation of a side plan view of a further portion of truing arrangement 100, showing pillow block 115 with shaft 120 installed therein. The pillow blocks are constructed to withstand the lateral load applied to vehicle drive shaft 125 while same is rotated.

Figure 10:
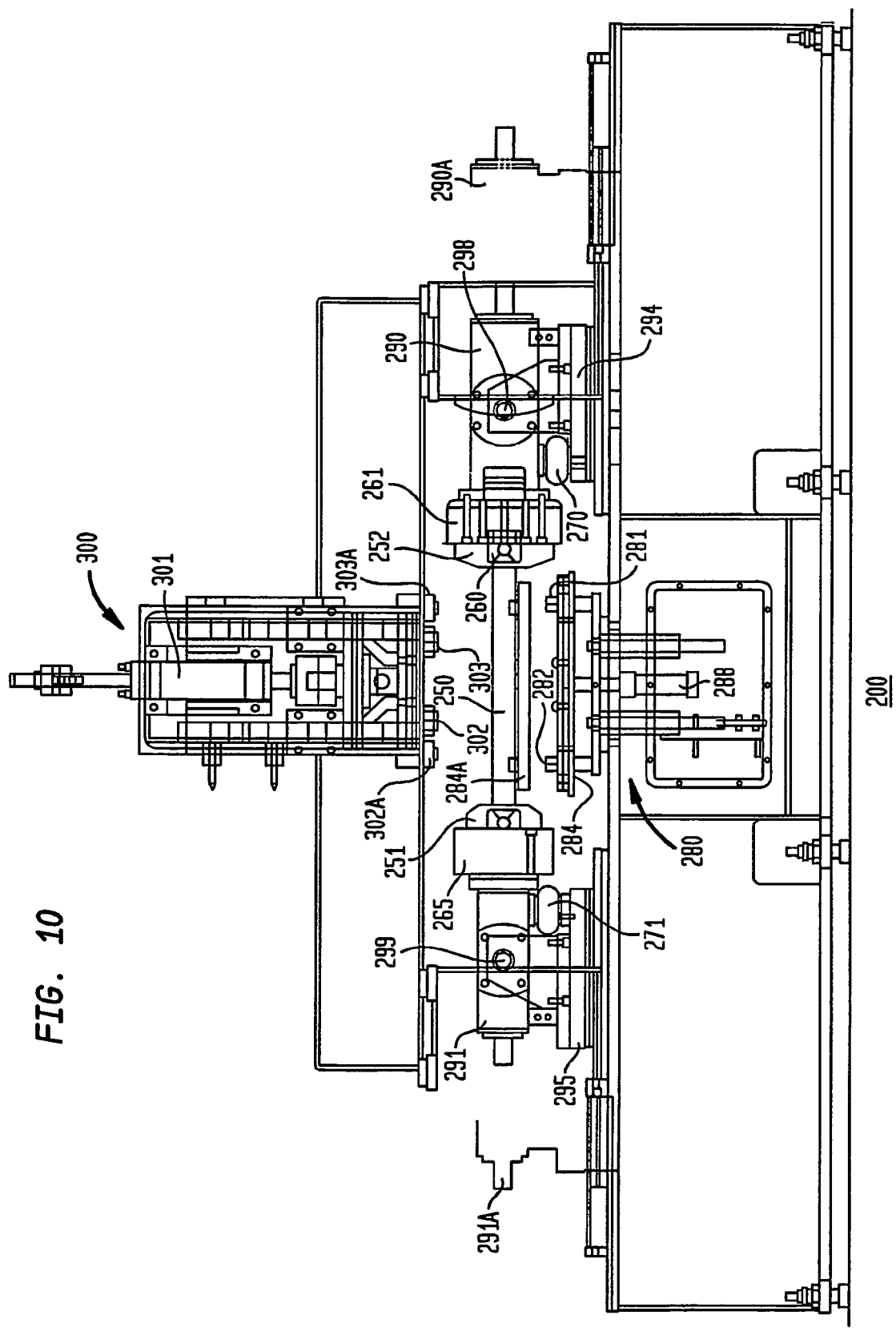
FIG. 10 is a simplified schematic representation of a front plan view of a further arrangement for truing a shaft constructed in accordance with the invention.

FIG. 10 is a simplified schematic front plan representation of a further arrangement 200 for truing a shaft constructed in accordance with the invention. In operation, a human operator (not shown) inserts a drive shaft section 250 after the weld yokes 251 and 252 are attached. Drive shaft 250 may, in certain embodiments, be a section of a drive shaft if the assembly is a multi piece design. Chuck jaws 260 in a first clamp head 261 are designed to clamp at the True Vehicle Rotating Center (TVRC), which is defined as the imaginary line connecting the center of the two rotating datum. The operator then indexes a second clamp head 265 to a position that allows it to clamp up to the TVRC of the distal end of drive shaft section 250 while air bags 270 and 271 are pressurized. The inflated air bags support the respective first and second clamp heads to the TVRC. It is understood, however, that forms of support other than air bags can be used in the practice of the invention.

During installation of drive shaft section 250 by the human operator, the drive shaft section is supported by a load support arrangement 280 that is provided in this specific illustrative embodiment of the invention with a pair of v-blocks 281 and 282 installed on a load support 284. Load support 284 can be translated in the vertical direction by operation of a cylinder 288 that may be actuated by any known mode of actuation, such as electrical, pneumatic, or hydraulic. Thus, for example, after the human operator or robotic conveyor deposits drive shaft section 250 onto v-blocks 281 and 282, load support 284 is raised to a position shown in phantom in the drawing and designated as load support 284A, whereby coupling of the drive shaft section to chucks 260 and 265 is facilitated. At this point, in embodiments of the invention where clamp support arrangements 290 and 291 are not in the form of rigidly mounted spindles, as will be discussed in further detail below, load support 284 is lowered and chucks 260 and 265 are released to droop by deflating respectively associated air bags 270 and 271.

In this specific illustrative embodiment of the invention, it is seen from FIG. 10 that first and second clamp heads 261 and 265 are coupled to respective ones of clamp support arrangements 290 and 291. Clamp support arrangements 290 and 291 are each pivotally coupled to respective base portions 294 and 295 at respective pivot couplings 298 and 299. Such pivoting freedom of motion permits the arrangement to accommodate bends in drive shaft section 250, but it is to be understood that such is not needed in embodiments of the invention where clamp support arrangements 290 and 291 are rigidly mounted.

It is to be noted that in this specific illustrative embodiment of the invention clamp support arrangements 290 and 291 are permitted an addition degree of freedom in the form of axial translation. This is represented in phantom in this figure as clamp support arrangements 290A and 291A. Rollers 302 and 303 are axially displaceable, as shown in phantom in the figure at roller positions 302A and 303A. Also, in some embodiments the rollers can be adjusted for offset, in addition to width, with respect to each other. It is to be understood, however, that in certain embodiments of the invention, clamp support arrangements 290 and 291 may be in the form of respective spindles that are rigidly mounted in a horizontal plane. In such an embodiment of the invention, chuck jaws 251 and 252 will permit articulation of the drive shaft as the lateral load is applied.

Upon completing the installation described hereinabove, drive shaft section 250 is rotated, as previously mentioned, and a ram 300 is then lowered, illustratively hydraulically by actuation of cylinder 301, whereby rollers 302 and 303 are urged into axially transverse communication with drive shaft section 250 to effect the plastic deformation thereof, as previously described. During the truing operation, one of base portions 294 and 295 is permitted to travel axially, illustratively as a result of it being installed on axially-directed rails (not specifically identified), in order to accommodate variations in the effective length of drive shaft section 250 as it is deformed axially in response to the application of the transaxial force by rollers 302 and 303.

Although the invention has been described in terms of specific embodiments and applications, persons skilled in the art can, in light of this teaching, generate additional embodiments without exceeding the scope or departing from the spirit of the invention claimed herein. Accordingly, it is to be understood that the drawing and description in this disclosure are proffered to facilitate comprehension of the invention, and should not be construed to limit the scope thereof.

What is claimed is:

1. An apparatus for processing a drive shaft for a vehicle, the drive shaft having a longitudinal axis and first and second ends, the apparatus comprising:

a drive arrangement for coupling to the first end of the drive shaft and applying a rotatory force to the drive shaft;

a second end support arrangement for rotationally supporting the drive shaft at its second end; and a transaxial drive for applying a transverse force in a direction transverse to the longitudinal axis of the drive shaft;

a first end support arrangement for rotatably supporting the drive shaft at its first end, said first end support arrangement including first and second rollers arranged to rotatably support the drive shaft in a direction counter to that of the transverse force and third and fourth rollers arranged to rotatably support the drive shaft in a direction opposite to that of said first and second rollers; and said second end support arrangement including first and second rollers arranged to rotatably support the drive shaft at its second end in a direction counter to that of the transverse force.

2. The apparatus of claim 1, wherein said transaxial drive comprises a transaxially displaceable roller arrangement for communicating with an outer surface of the drive shaft in a region thereof intermediate of said drive arrangement and said support arrangement, via which the transverse force is applied.

3. The apparatus of claim 2, wherein the transverse force has a magnitude sufficient to cause bending of the drive shaft in the direction transverse to the longitudinal axis thereof as the drive shaft is rotated.

4. The apparatus of claim 2, wherein the transverse force has a magnitude sufficient to cause plastic deformation of the drive shaft in the direction transverse to the longitudinal axis thereof as the drive shaft is rotated.

5. The apparatus of claim 2, wherein said transaxial drive comprises:
an hydraulic ram for applying an axial ram force; and
a linkage arrangement for delivering the axial ram force to the transaxially displaceable roller arrangement.

6. The apparatus of claim 1, wherein said first and second rollers of said second end support arrangement are each provided with radially extended central portions.

7. The apparatus of claim 1, wherein said first and second rollers of said first end support arrangement are each provided with radially extended central portions.

8. The apparatus of claim 1, wherein said third and fourth rollers of said first end support arrangement are each provided with radially extended central portions.

9. The apparatus of claim 1, wherein said drive arrangement causes the drive shaft to be rotated at a rate of rotation of approximately between 300 and 4500 rpm.

10. The apparatus of claim 1, wherein the drive shaft has angularly displaceably coupled thereto a second drive shaft portion, and there is further provided a second drive shaft portion support arrangement for supporting the second drive shaft portion rotatably in fixed axial relation to the drive shaft as the drive shaft is rotated.

11. The apparatus of claim 10, wherein the fixed axial relation is a substantially coaxial relationship.

12. The apparatus of claim 10, wherein there is further provided a universal coupler for coupling said second drive shaft portion to the drive shaft.

13. The apparatus of claim 10, wherein the second drive shaft portion comprises a Thomson shaft.

14. The apparatus of claim 10, wherein said second drive shaft portion support arrangement is configured to permit axial displacement of the second drive shaft portion in response to non-trueness of the drive shaft and the application of the transverse force in the direction transverse to the longitudinal axis of the drive shaft.

15. A method of improving the trueness of a drive shaft of a vehicle, the drive shaft having a longitudinal axis and first and second ends, the method comprising the steps of:
installing the drive shaft onto a support arrangement that supports the drive shaft rotatively at its first and second ends;
rotating the drive shaft about its longitudinal axis;
applying a transaxial force to the drive shaft in a region intermediate of the first and second
providing a first end support arrangement for rotatably supporting the drive shaft at its first end including first and second rollers arranged to rotatably support the drive shaft in a direction counter to that of the transverse force and third and fourth rollers arranged to rotatably support the drive shaft in a direction opposite to that of the first and second rollers;
providing a second end support arrangement comprising first and second rollers arranged to rotatably support the drive shaft at its second end in a direction counter to the transverse force; and
releasing the transaxial force.

16. The method of claim 15, wherein said step of applying comprises the step of applying the transaxial force having a magnitude sufficient to bend the drive shaft as it is rotated.

17. The method of claim 15, wherein said step of rotating the drive shaft about its longitudinal axis comprises the step of rotating the drive shaft at a rate of rotation of approximately between 300 and 4500 rpm.

18. The method of claim 15, wherein there is provided the further step of supporting in a second support arrangement a second drive shaft portion that is angularly displaceably coupled to the drive shaft.

19. The method of claim 18, wherein there is provided the further step of permitting the second drive shaft portion to be displaced longitudinally in the second support arrangement in response to non-trueness of the drive shaft.

20. The method of claim 18, wherein there is provided the further step of permitting the second drive shaft portion to be displaced longitudinally in the second support arrangement in response to said step of applying a transaxial force to the drive shaft.

21. The method of claim 15, wherein said step of applying a transaxial force to the drive shaft comprises the steps of:
actuating an hydraulic cylinder to produce an axial displacement of a displacement element;
coupling the displacement element to a roller arrangement; and
engaging the roller arrangement to an outer surface of the drive shaft in a region of the drive shaft intermediate of the first and second ends thereof.

* * * * *